4 Sheets—Sheet 1.

C. SEYBOLD.

BOOK TRIMMING MACHINE.

No. 11,184. Reissued Aug. 4, 1891.

Witnesses.
Chas. S. Ahlborn,
W. B. Brice,

Inventor.
Charles Seybold
per O. M. Hill, Atty.

THE NORRIS PETERS CO., PHOTO-LITHO., WASHINGTON, D. C.

C. SEYBOLD.

BOOK TRIMMING MACHINE.

No. 11,184. Reissued Aug. 4, 1891.

Witnesses.
Chas. A. Ahlborn
W. B. Brico,

Inventor.
Charles Seybold
per O. M. Hill, Atty.

THE MORRIS PETERS CO., PHOTO-LITHO., WASHINGTON, D. C.

C. SEYBOLD.
BOOK TRIMMING MACHINE.
No. 11,184. Reissued Aug. 4, 1891.
Fig. 3.
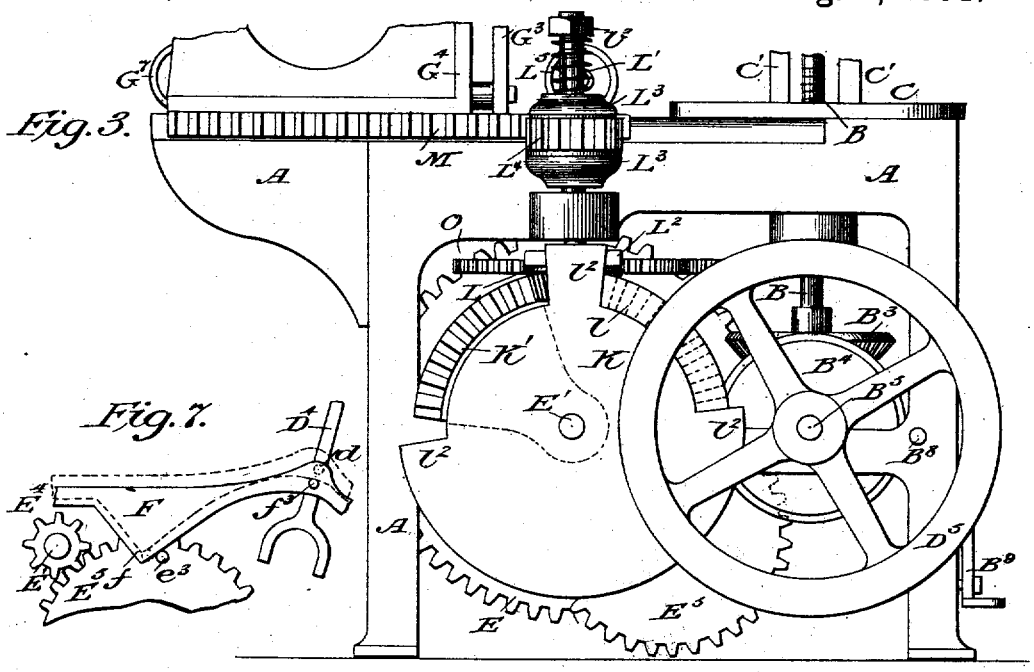
Fig. 7.
Fig. 4.
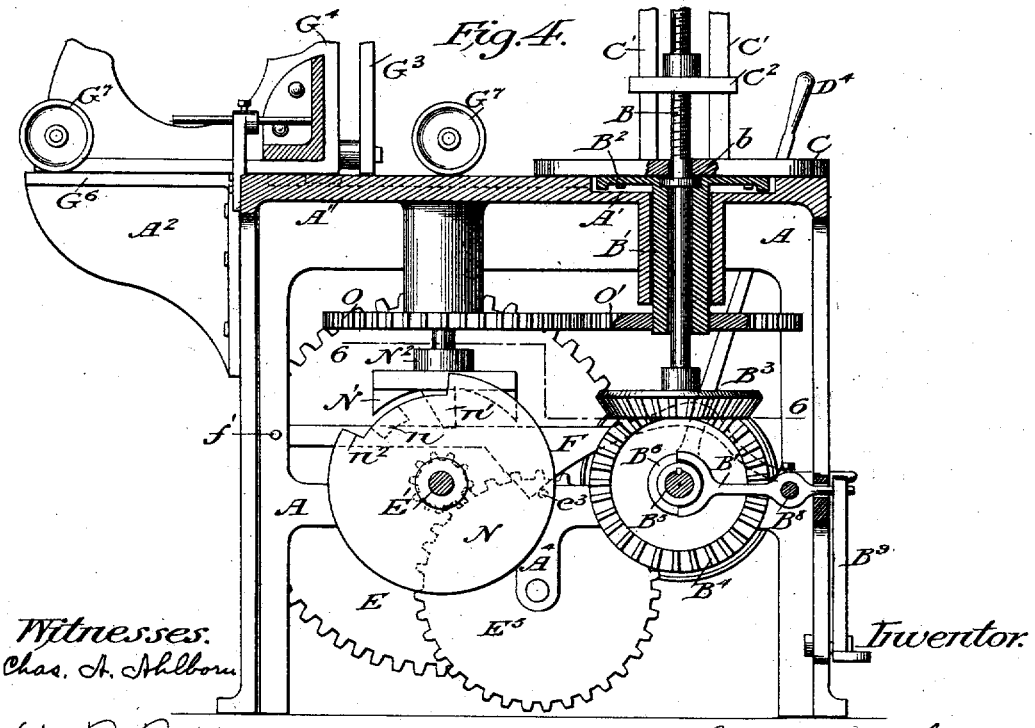
Witnesses.
Chas. A. Shilborn
W. B. Brico.
Inventor.
Charles Seybold
per O. M. Hill, Atty.
THE NORRIS PETERS CO., PHOTO-LITHO., WASHINGTON, D. C.

C. SEYBOLD.

BOOK TRIMMING MACHINE.

No. 11,184. Reissued Aug. 4, 1891.

Witnesses.
Chas. S. Ahlborn
W. B. Brico.

Inventor.
Charles Seybold
per O. M. Hill
Atty.

THE NORRIS PETERS CO., PHOTO-LITHO., WASHINGTON, D. C.

BEST AVAILABLE COPY

UNITED STATES PATENT OFFICE.

CHARLES SEYBOLD, OF CINCINNATI, OHIO.

BOOK-TRIMMING MACHINE.

SPECIFICATION forming part of Reissued Letters Patent No. 11,184, dated August 4, 1891.

Original No. 442,295, dated December 9, 1890. Application for reissue filed June 30, 1891. Serial No. 398,081.

*To all whom it may concern:*

Be it known that I, CHARLES SEYBOLD, a citizen of the United States, residing at Cincinnati, in the county of Hamilton and State of Ohio, have invented certain new and useful Improvements in Book-Trimming Machines, of which the following is a specification, reference being had to the accompanying drawings, forming a part thereof, in which similar letters of reference refer to corresponding parts of the machine throughout.

The primary object of my invention is to provide a machine for trimming bundles of paper into book form, the said machine being so constructed as to clamp the bundle to be trimmed in proper position and afterward to automatically trim or cut each side of the bundle consecutively without stopping the machine, the latter being so constructed as that it will stop automatically after having made the fourth or last cut, as will more fully hereinafter appear.

Figure 1:
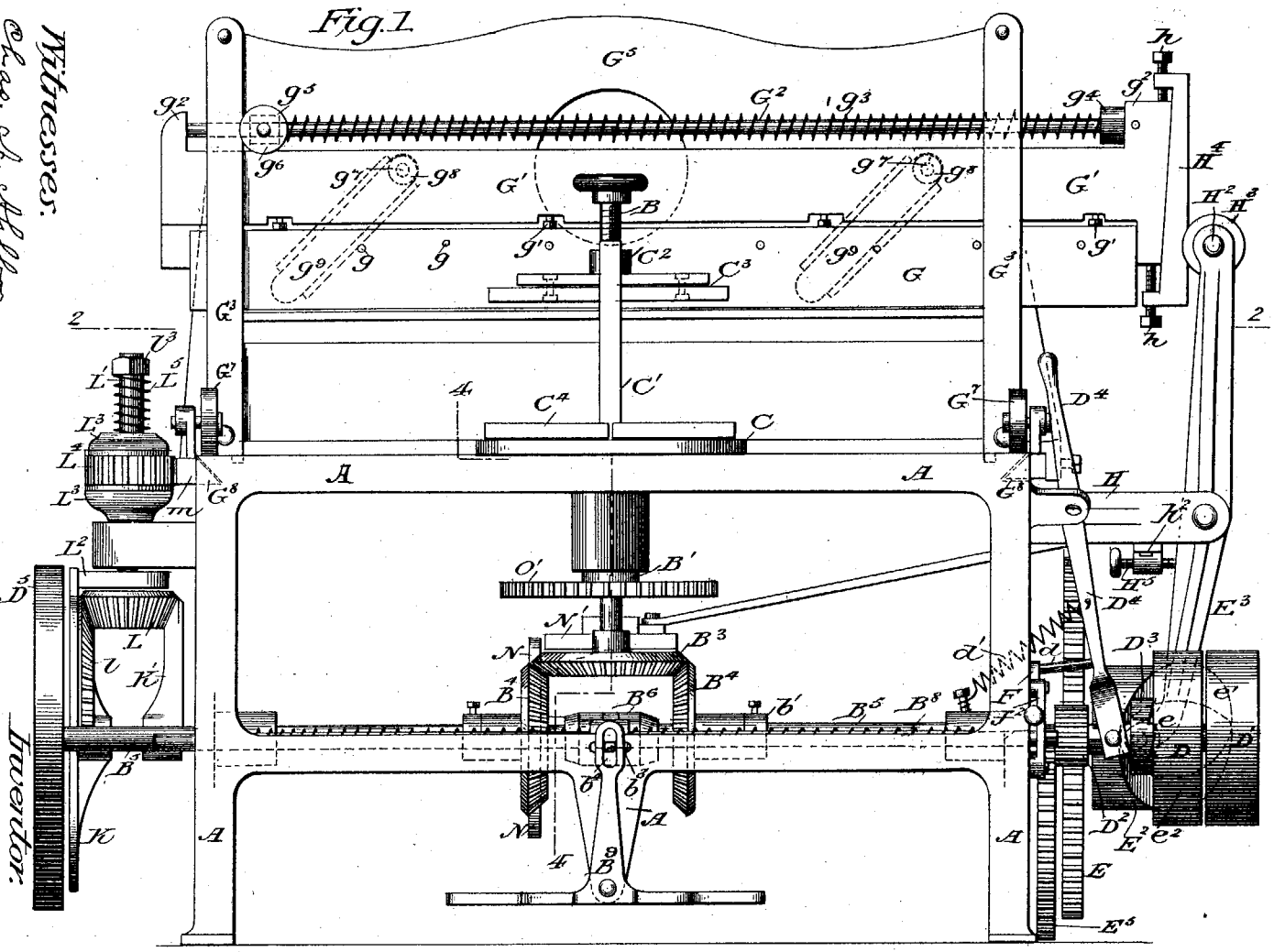
Figure 2:
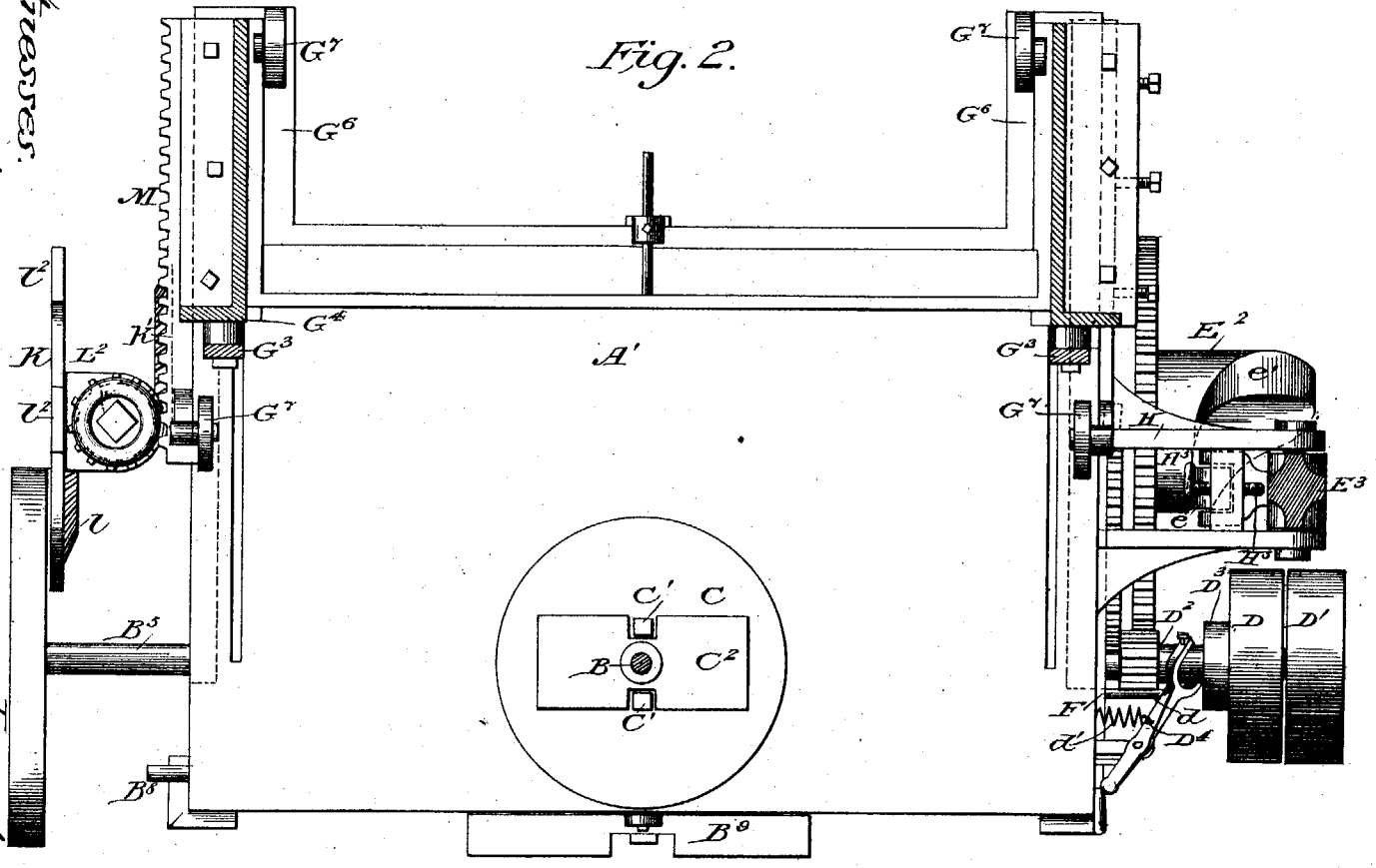
Figure 5:
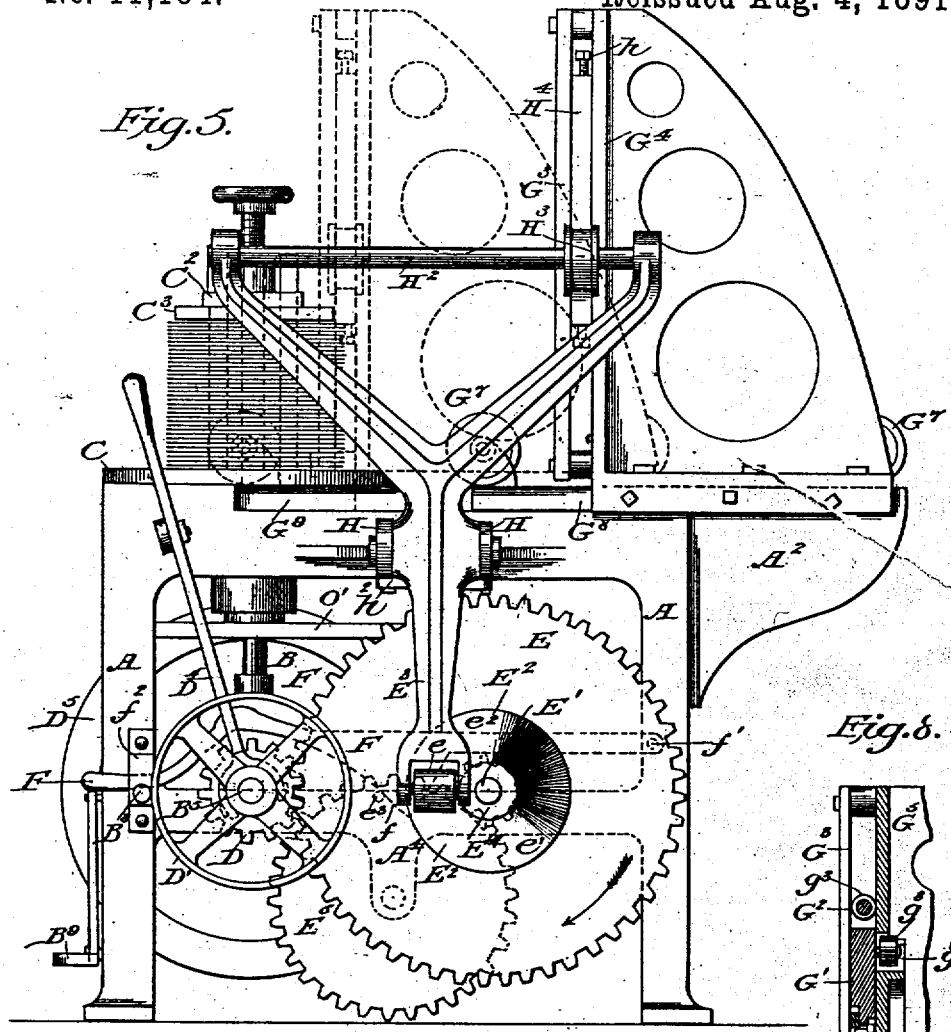
Figure 8:
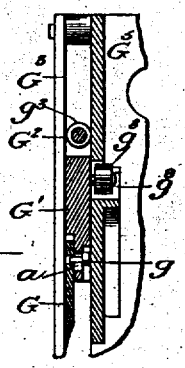
Figure 6:
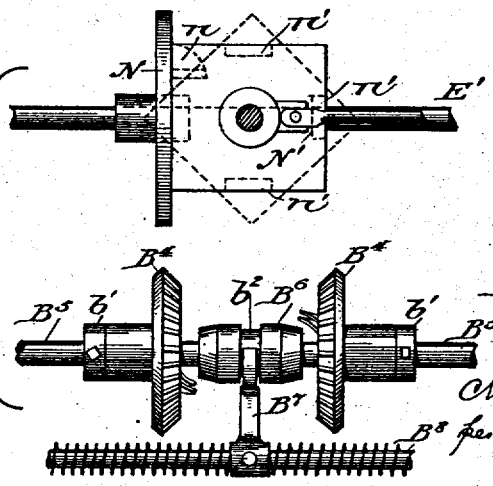

In the accompanying drawings, Figure 1 is a front elevation of a machine embodying the features of my invention, the length of the machine as shown in comparison to the height thereof being about one-third longer than what the machine is actually built. Fig. 2 is a horizontal section taken on the dotted line 2 2 of Fig. 1, showing the top portion of the bed-plate, clamp-table, and operating mechanism. Fig. 3 is an end elevation taken at left hand in Fig. 1, showing the preferred form of mechanism for causing the knife-carriage to automatically move back and forth on the bed-plate, the upper portion of said knife-carriage and clamping mechanism being broken away. Fig. 4 is a vertical section taken on the dotted line 4 4 of Fig. 1, looking toward the right hand in said figure, showing the preferred means for securing the clamp-screw and its connecting parts in proper position, and also the preferred means for automatically rotating the clamp-table a partial rotation at certain determinate intervals. Fig. 5 is an end elevation of the machine shown at right hand in Fig. 1, the dotted lines showing the position of the knife-carriage when the latter has traveled forward in position for the knife to trim one side the bundle of papers held to place in the clamp. Fig. 6 is a section taken on the dotted line 6 6 of Fig. 4, being a top view of the clutch mechanism for imparting a rotary motion to the clamp-screw in either direction and of the mechanism for automatically rotating the clamp-table a partial rotation at certain determinate intervals. Fig. 7 is a side elevation of a part of the lever for automatically stopping the machine and its connecting parts, the dotted lines showing said lever elevated, in which position the machine does not operate. Fig. 8 is a vertical section taken through the knife-bed, knife, and the vertical cross-plate of the knife-carriage, showing one of the rollers which support the knife-bed in position in the inclined groove in the cross-plate.

My improved machine for trimming bundles of paper into book form is preferably constructed as follows:

The operating mechanism is supported and journaled in suitable frame-work A and brackets attached thereto, said frame-work being covered with a suitable bed-plate A′, attached thereto, the rear extensions $G^6$ of the bed-plate being supported by the brackets $A^2$, as shown.

The mechanism for clamping the bundle of paper in position to be cut is preferably constructed as follows: The clamp-screw B is held in position by means of a washer *b*, (see Fig. 4,) interposed in a circular recess in the top of sleeve B′, directly beneath the clamp-table C, as shown, the said sleeve B′ having an enlarged circular head $B^2$ resting in a circular countersunk portion of the bed-plate A′, the table C being connected to said enlarged head of the sleeve, as shown in Fig. 4. To the lower end of screw-rod B is secured the miter-wheel $B^3$, which latter engages with the corresponding miter-wheels $B^4$ $B^4$, placed on the main shaft $B^5$, and held to place by means of the set-collars *b′*, as shown in Figs. 1 and 6. To the clamp-table C are connected the vertical guides C′ C′, between which the screw-clamp $C^2$ travels up and down on the screw-rod as the latter is rotated in either direction. To the clamp $C^2$ is bolted or otherwise suitably secured the pattern or form plates $C^3$, the latter being made of varying sizes to conform to the size of book desired to be trimmed. To the main shaft $B^5$ and between the miter-wheels $B^4$ is secured the friction-clutch $B^6$, the latter having a feather-and-groove connection with said shaft to permit said clutch to be moved horizontally thereon. The clutch $B^6$ has a central circular recess $b^2$, in which the bifurcated portions of bar $B^7$ rest, as shown in Fig. 6. The clutch-bar $B^7$ has a rod $B^8$ passing through it, as shown by section in Fig. 4, and also shown in Fig. 6, the outer end of said bar passing through an elongated opening $b^3$ in the cross-frame, (see Fig. 1,) the outer end of said bar operating in a vertically-elongated opening $b^4$ in the extension of the foot-treadle $B^9$, as shown in Figs. 1 and 4. This foot-treadle is pivoted to the downward extension $A^3$ of the cross-frame A, as shown in Fig. 1. The rod $B^8$ is suitably connected to the end frames of the machine, suitable spiral springs being interposed around said rod between the end frames and the clutch-bar $B^7$ in order to retain the clutch centrally between the miter-wheels $B^4$ at all times, except when operated by means of the foot-treadle.

Having described the preferable construction of the mechanism for clamping the paper to be trimmed on the clamp-table, I will now describe the operation of this part of the machine.

The bundle or bundles of paper to be trimmed are placed on the table C (said table preferably being provided with the wooden covers $C^4$ shown in Fig. 1) at either side the guides C′, after which the form-plate $C^3$, attached to the clamp-plate $C^2$, is brought down on said bundles of paper by placing the foot on one side of the treadle, which causes the clutch $B^6$ to slide on the revolving shaft $B^5$ and engage one of the miter-wheels $B^4$, which latter causes the miter-wheel $B^3$ and with it the screw-rod B to rotate. The rotation in one direction of this screw-rod B causes the clamp $C^2$ and with it the form-plate $C^3$ to descend on the screw-rod and firmly clamp the paper in position on the table C. It will be seen that I am enabled to clamp two bundles of paper at one time, one on each side of the guides C′. The pressure is kept on the foot-treadle until the paper is firmly clamped to place, after which the pressure is released, and the clutch $B^6$ will be thrown back in its normal position away from the miter-wheel by means of the coiled spring on rod $B^8$. After the bundles of paper have been trimmed (in the manner hereinafter stated) pressure is put on the opposite side of the treadle, which will cause a reverse revolution of the screw-rod, thus causing the clamp-plate $C^2$ and its form-plate $C^3$ to travel up said rod, when the bundles of trimmed paper may be removed.

Having described the preferable form of mechanism and its operation for clamping the bundles of paper in position to be trimmed, I will now describe the preferable form of mechanism for automatically driving the knife-carriage and its knife up to and away from the bundles of paper and for operating said knife and the clamp-table, and also for automatically stopping the machine at certain determinate intervals.

To the main shaft $B^5$ are secured the usual tight and loose pulleys D and D′, a suitable clutch-pinion $D^2$ being loosely secured to said shaft in the usual manner for engaging or disengaging the clutch $D^3$ with the tight pulley D by means of lever $D^4$, the object of this mechanism being to permit of a constant revolution of shaft $B^5$ and pulley D without imparting motion to the pinion $D^2$, excepting when desired to operate the machine. This part of the mechanism is old and well known for transmitting power, and does not constitute any feature of my invention, excepting in connection with other mechanism hereinafter described. The shaft $B^5$ is provided on its opposite end with the usual balance-wheel $D^5$. The clutch-pinion $D^2$ meshes with the large gear E, which latter is keyed to one end of the auxiliary shaft E′, the latter being suitably journaled in the end frames of the machine. To the outer central face of gear E is cast the face-cam $E^2$, against which the roller *e*, pivoted in the lower end of lever $E^3$, rotates. As the cam is rotated the roller is made to travel outward over the inclined face *e′* of the cam, forcing the lower portion of the lever outward and the upper portion of the lever inward and downward, and with it the knife-bed, as will more fully appear. So soon as the roller *e* has reached the outermost point on the cam said roller is made to travel back down the inclined face $e^2$ into the innermost recess between said faces of the cam by means of the spring connected to the knife-bed, as will more fully hereinafter appear.

To the inner face of the gear E, and around its journal-bearing, is cast the pinion $E^4$, as shown in Fig. 7 and by dotted lines in Figs. 4 and 5, said pinion meshing with the gear $E^5$, which latter is journaled on a stud projecting outward from the downward extension $A^4$ of the frame, as shown in Figs. 4 and 5. The pinion $E^4$, cast with the gear E, is one-fourth the diameter of gear $E^5$, with which it meshes, in order that four revolutions of the auxiliary shaft E′ will produce one revolution of the gear $E^5$. To the inner face of gear $E^5$, and near its outer edge, is cast a lug $e^3$, (see Figs. 5 and 7,) which lug as the gear is rotated comes in contact with the extension *f* of lever F, as shown in Fig. 7, and raises the outer end of said lever, the latter being pivoted at its rear end to the frame, as shown at *f′* in Figs. 4 and 5. The outer end of lever F operates in the bracket $f^2$. (Shown in Fig. 5.)

As shown in Figs. 1 and 2, the lever $D^4$ has a pin *d* connected thereto, which pin is held against the outer face of lever F when the machine is in operation and in the opening $f^3$ (see Fig. 7) when the machine is stopped, said pin being held to position by means of a spring *d′*, attached to the lever $D^4$ and to the frame of the machine.

To start the machine the lever $D^4$ is pulled inward, which causes the clutch to engage with the tight pulley, and the pin $d$ is drawn out of the opening $f^3$ in lever F, permitting the outer end of said lever F to drop down in the bracket $f^2$, in which position the pin $d$ is held against the outer face of lever F just above the opening $f^3$, as shown by dotted line in Fig. 7, by means of the spring $d'$. The clutch is held in position in contact with the tight pulley by reason of the pin $d$ bearing against the face of lever F, which causes the clutch-pinion $D^2$ to impart motion to gear E, and as gear E is rotated the pinion $E^4$ connected thereto rotates and with it the gear $E^5$. The pinion $E^4$ being one-fourth the diameter of gear $E^5$, it will take four revolutions of said pinion to accomplish one revolution of said gear, and so soon as the pin $e^3$ on gear $E^5$ comes in contact with the inclined face of lug $f$ on lever F the outer end of said lever is elevated, as shown by dotted lines in Fig. 7, in which position the pin $d$ on lever $D^4$ is drawn into the opening $f^3$ by means of spring $d'$, which operation draws the clutch away from the tight pulley and stops the operation of the machine.

It will be seen that the machine is stopped automatically at every fourth revolution, the number of revolutions to be given the auxiliary shaft before stopping the machine being governed by the size or number of cogs on pinion $E^4$, which may be varied, if desired. The object of this arrangement for automatically stopping the machine at each fourth revolution of the auxiliary shaft is to permit of the trimmed bundles being removed, each revolution of the auxiliary shaft trimming one side of the bundle, as will more fully hereinafter appear.

The knife G is secured to the knife-bed G′ by means of bolts $g$, passed through the knife and resting in a countersink in such a manner as that the head of each bolt will come flush with the outer face of the knife, said bolts passing through the elongated openings $a$ in the lower portion of the knife-bed G′, as shown in Fig. 8. The knife is adjusted vertically on its bed by means of the set-bolts $g'$, after which the nuts on the bolts $g$ are tightened. Between the outer upward extension $g^2$ of the knife-bed is secured the rod $G^2$, around which is secured a stiff spiral spring $g^3$, interposed between the lug $g^4$ and lug $g^5$, the latter being loosely connected to said rod, the said lug $g^5$ having the roller $g^6$ pivotally connected to a stud thereon, as shown in Fig. 1. This roller $g^6$ has the side circumferential flanges which engage the outer and inner face of guide $G^3$, against which said roller impinges and rotates as the knife-bed is raised or lowered. The knife-bed is held in place between the vertical guide-plates $G^3$ and the rear vertical plate $G^5$ of the carriage in an elevated position by means of the spring $g^3$, which is compressed around the rod $G^2$ between the stationary lug $g^4$ and the sliding lug $g^5$, connected to roller $g^6$. To the rear of the bed-plate is connected suitable lugs on which the rollers $g^8$ rotate, the latter rotating against the lower face of the elongated inclined grooves $g^9$ in the rear plate $G^5$, as shown in Fig. 8 and by dotted lines in Fig. 1. When the knife-bed is forced downward, the rollers $g^8$ travel down the face of said inclined grooves, said knife-bed being elevated again by the tension of spring $g^3$ against the lug $g^5$, the latter traveling up with its roller $g^6$ rotating against the guide-plate $G^3$. The knife-carriage is made up of the vertical end plates $G^4$, guide-plates $G^3$, rear cross-plate $G^5$, and rearward extensions $G^6$. This carriage is upheld and travels upon the rollers $G^7$, which latter rotate upon suitable spindles connected in any desired manner to the frame of the carriage, said rollers rotating and traveling upon the bed-plate A′ and the rear extensions thereof, as shown. The carriage is retained to the frame and bed-plate by means of the wedge-shaped projections $G^8$ on the carriage engaging a similar recess $G^9$ in the sides of the end frames, as shown by dotted lines in Fig. 1.

Having described the preferred construction of the carriage, knife-bed, and knife and their connecting parts, I will now describe the preferred means, as shown, for operating the knife-bed and its knife, which is as follows:

Between the extensions H, cast with the end frame A, is pivoted the lever $E^3$, to the lower end of which is connected the roller $e$, which latter rotates and bears against the two inclined faces of the cam $E^2$, in the manner aforedescribed. The upper portion of this lever $E^3$ above its pivotal point is bifurcated, as shown in Fig. 5, a suitable shaft $H^2$ being connected to the top portions of said bifurcations, as shown, on which shaft is placed the flanged roller $H^3$. This roller rests and rotates against the vertical gage $H^4$, the latter being connected to one end of the knife-bed by means of the set-screws $h$, which operate in extensions of said gage against said knife-bed, as shown in Figs. 1 and 5. The flanged roller $H^3$ is kept in contact with the gage at all times, and moves back and forth on the shaft as the carriage travels forward or backward. If desired, this gage and set-screws may be dispensed with, in which event the roller will operate against the vertical face of the knife-bed; but it is preferred to employ said gage to assist in adjusting the downstroke of the knife. The operation of this portion of the machine is as follows: The revolution of cam $E^2$ causes the roller $e$ to travel outward over its inclined face $e'$, thus forcing the lower end portion of lever $E^3$ outward and its upper bifurcated portion inward and downward, and with it the knife-bed and its knife, the roller $H^3$ traveling down over the face of gage $H^4$. So soon as the roller $e$ on lever $E^3$ has passed the outermost point on the face $e'$ of the cam the pressure on the knife-bed is released, and the latter, with its knife, is elevated through the tension of spring $g^3$, as aforedescribed, and as the knife-bed and knife are being elevated the upper portion of lever $E^3$ is forced outward and its lower portion, with the roller $e$, is forced inward, said roller traveling back on the inclined face $e^2$ of the cam, as shown in Fig. 1, in which position it is in readiness to begin another cut.

It is desired that the knife be not elevated higher than the thickness of paper after being clamped in position, for the reason that the knife must strike against the form-plate $C^3$ as the carriage is traveling forward, as will hereinafter appear. For the purpose of adjusting the height to which said knife may be elevated, I have provided the set-screw $H^5$, which operates in the bracket $h^2$, connected to the projections H, as shown in Fig. 1, the outer end of said screw bearing against the lever $E^3$ below its pivotal point. Turning the screw in one direction forces the upper portion of the lever inward and the knife is lowered, above which point it can in no case be elevated except by turning the screw in the opposite direction, which will permit the lower portion of the lever to move inward, and the knife will be correspondingly elevated.

The depth of stroke to be given the knife is regulated principally by means of the gage $H^4$, which is wedge-shaped on its inner face and rests against the inclined outer face of the knife-bed, as shown, said gage being regulated up or down on said knife-bed by means of the set-screws $h$. To lower the cut the gage is elevated, and to elevate the cut the gage is lowered.

Having described the construction of the carriage and the construction and operation of the knife-bed and knife on said carriage, I will now describe the preferable construction of mechanism shown for automatically operating said carriage and its knife up to and away from the form-plate clamped on the bundles of paper at certain determinate intervals. This mechanism for thus causing the carriage to automatically travel back and forth on the rollers $G^7$, the latter resting on the bed-plate A′ and its rearward extensions, is fully shown in Figs. 1, 2, and 3, and is as follows:

To the auxiliary shaft E′, outside the frame, is keyed the disk K and toothed segment K′, said disk being provided with the beveled toothed portion $l$ for about one-quarter of its inner circumference, said teeth on the disk meshing with the beveled pinion L at one side thereof, which imparts motion in one direction to said pinion. The segment K′ in its rotation imparts motion to the pinion L in a direction opposite to that imparted by the toothed portion of the disk, said segment being so located that it will act shortly after the said toothed portion of the disk shall have passed said pinion. The pinion L is keyed to the shaft L′, to which latter is also keyed the stop-lug $L^2$, which latter has a flat face to impinge against the inner face of the outer bearing-faces $l^2$ on the disk K, said bearing-faces being so located that the flat face of stop-lug $L^2$ will bear against the bearing-faces $l^2$ when the teeth of said segment and disk are not in contact with said pinion, the object being to retain said pinion in proper position to mesh with the segment and toothed portion of the disk in their rotation. To the shaft L′ is connected the two caps $L^3$ by means of a feather-and-groove connection, to admit of a vertical movement to said caps, between which the pinion $L^4$ is loosely connected to said shaft, but connected therewith by the tension of a spring $L^5$, interposed between the top cap $L^3$ and nut $l^3$, suitable friction-washers being interposed between said caps and pinion. To the outer edge of the knife-carriage is connected the horizontal toothed rack M, in which the pinion $L^4$ meshes in its rotation in either direction. The operation of this feature of my invention is as follows: Motion being imparted to the auxiliary shaft E′, the disk K and segment K′ are rotated in the same direction on opposite sides of the pinion L, which causes an intermittent motion to be imparted to said pinion and its shaft L′ in opposite directions, one revolution of said shaft E′ causing the carriage to move forward and backward through the medium of pinion $L^4$ and rack M. The pinion $L^4$, as aforestated, is loosely connected to its shaft, being held in position therewith between the caps $L^3$ by means of a suitable spring. The tension of this spring is strong enough to hold said pinion in position and to operate the carriage back and forth; but so soon as the knife on the carriage moves up and strikes the form-plate $C^3$ on the clamp the forward movement of the carriage is stopped and the pinion $L^4$ ceases to rotate, the caps $L^3$ rotating on said pinion until the teeth $l$ on the disk have passed the pinion L. So soon as the knife strikes the form-plate it is made to descend with a shearing cut in the manner aforedescribed, and after having made its cut the carriage and knife are carried back by means of the toothed segment K′. The object of having this pinion $L^4$ loosely connected to its shaft and held in position by friction is to accommodate varying sizes and configurations of form-plates which are used to determine the size of book or bundle to be trimmed.

I will now describe the preferable construction of the mechanism shown for automatically imparting a partial revolution of the table on which the bundles of paper are clamped after the carriage and its knife have receded from the form-plate, as aforedescribed, which construction is as follows:

To the auxiliary shaft E′ between the end frames is keyed the vertical disk N, having a horizontal lug $n$ cast to its inner face, which lug, as the disk is being rotated, engages with one of the vertical lugs $n'$, cast to the bottom portion of the horizontal plate N′, as shown in Figs. 4 and 6. The plate N′ is keyed to the vertical shaft $N^2$, to which latter is also keyed the gear O, which meshes with a similar gear O′, connected to the sleeve B′, (see Fig. 4,) the enlarged head $B^2$ of said sleeve being connected to the table C, on which the bundles of paper are clamped. A portion of the outer circumferential face of disk N near the lug $n$ is cut away, as shown at $n^2$, Fig. 4, in order to permit one corner of the horizontal plate N′ to give a quarter-turn over said disk at its cut-away portion when the lug $n$ on the disk comes in contact with one of the lugs $n'$ on the plate. The inner face of said disk impinges against one face of the plate at all times, except at its cut-away portion, thus securely retaining said plate and the table in position for the knife to act.

The operation of this feature of my invention for automatically imparting a partial rotation to the clamp-table at certain determinate intervals is as follows: A rotary motion being imparted to the auxiliary shaft, the vertical disk N is rotated, as indicated in Fig. 4, the lug $n$ coming in contact with one of the vertical lugs $n'$ on the horizontal plate N′, and so soon as the two lugs come in contact the plate N′ is given a quarter-turn, the corner of said plate passing over the disk at its cut-away portion, as indicated by dotted lines in Fig. 6. Each successive revolution of the disk gives a quarter-turn to the plate, which motion is imparted to the table C through the medium of shaft $N^2$, gears O O′, and sleeve B′, to which latter the gear O′ and table C are connected, as shown in Fig. 4.

Having described the operation of each operative part of the machine in connection with its preferable construction, I will now briefly describe the operation of the machine as a whole.

The bundle or bundles of paper to be trimmed are placed on the table C at either side the guides C′, after which the form-plate $C^3$, attached to the clamp $C^2$, is made to descend on the screw-rod by putting pressure on one side the foot-treadle $B^9$, the pressure being applied until the paper is sufficiently clamped, when the pressure is removed, causing the clutch to disengage with one of the miter-wheels $B^4$, as aforedescribed. Having clamped the bundles of paper in position, as shown in Fig. 5, the operator grasps the lever $D^4$, giving it a pull inward, which starts the machine in motion. The pin $d$, bearing against the face of lever F, serves to retain the clutch in contact with the tight pulley until automatically released, as will presently appear. So soon as motion is imparted to the auxiliary shaft E′ the teeth $l$ on disk K will cause the knife-carriage to travel forward on the bed-plate, in the manner aforedescribed, until the knife G strikes the inner face of the form-plate $C^3$, as shown by dotted lines in Fig. 5. So soon as the face of the knife strikes the form-plate the motion of the carriage is stopped in the manner described, the pinion $L^4$ being held to place by friction between the caps $L^3$. The cam $E^2$ is so adjusted with reference to the disk K and segment K′ that when the knife is brought up against the form-plate $C^3$ said knife is made to descend with a shearing cut, through the medium of the knife-bed G′, lever $E^3$, and cam $E^2$ in the manner aforedescribed, accurately trimming one side of the paper, and so soon as the knife has made its cut the carriage begins to travel backward through the medium of segment K′, and the knife-bed and knife are gradually elevated again in the manner described. The carriage and its knife having traveled up to the form-plate, made one cut, and receded again, it is necessary that the clamp-table, paper, and form-plate be given a quarter-turn in order to present a new face to the knife. This is accomplished automatically by adjusting the disk N and plate N′ in such a position with reference to the segment K′ and cam $E^2$ as that after said segment shall have caused the carriage to travel back and after the knife has been elevated in the manner aforedescribed the lug $n$ on the disk N will come in contact with one of the lugs $n'$ on plate N′, which will cause the table to be given a quarter-turn, as set forth. The inner face of the disk N bearing against the side of the plate N′, except at its cut-away portion, will securely retain said table in a fixed position until the knife has again made its cut and receded, as described.

It will be seen that it takes but one revolution of the auxiliary shaft to cause the knife-carriage to carry the knife up to the form-plate, cut one side the bundles of paper, elevate and carry the knife again, and give the clamp-table a quarter-turn, presenting a new face to be trimmed. Each successive revolution of the auxiliary shaft automatically carries the knife forward, cuts one side the bundle, elevates and carries the knife back away from the form-plate, and gives the latter and the clamp-table one quarter-turn, until at the completion of the fourth revolution of said shaft, after the four sides of the bundles have been trimmed, the machine is automatically stopped by means of the lug $e^3$ on gear $E^5$ coming in contact with the projection $f$ on lever F, (see Fig. 7,) which causes the outer end of said lever to be elevated, which will cause the pin $d$ on lever $D^4$ to drop into the opening $f^3$ in said lever F by reason of the tension of spring $d'$, which operation will withdraw the clutch from the tight pulley, stopping the machine.

It is apparent that my improved machine for trimming books may be advantageously used to trim circulars, posters, and various other articles besides books, and may be adjusted, if so desired, to trim articles having more than four faces by simply changing the gear $E^5$ or the pinion $E^4$ so that it will require more than four revolutions of the auxiliary shaft to automatically stop the machine.

The advantages of my improved machine for trimming books will be apparent when the time saved is taken into consideration. The features of automatically carrying the knife back and forth, rotating the clamp-table, and stopping the machine all at certain determinate intervals are very valuable ones when combined in a book-trimmer such as I have shown and described.

While the mechanism shown for accomplishing the various operations enumerated automatically is the preferred form, any suitable operative mechanism may be employed for automatically carrying the knife up to and away from the form-plate, rotating the clamp-table a partial rotation, operating the knife, and stopping the machine all at certain determinate intervals. If desired, one or more of said features of my invention may be used in connection with book-trimmers differing in construction from that herein specifically set forth.

What I claim as new, and desire to secure by Letters Patent, is—

1. In a machine for trimming books, the vertically-movable knife-bed and knife suitably mounted on a traveling carriage, in combination with means, substantially as set forth, for automatically driving said carriage forward and backward on the bed-plate of the machine, and suitable means for clamping the bundle of paper in position and for operating said knife, substantially as set forth.

2. In a machine for trimming books, the clamping mechanism, constructed and operated substantially as set forth and provided with a form-plate, in combination with a knife-bed and knife mounted in a traveling carriage in a vertically-movable position, and means, substantially as set forth, for automatically carrying said knife up to and away from said form-plate at certain determinate intervals, and mechanism for operating said knife, as and for the purposes set forth.

3. In a machine for trimming books, suitable mechanism for clamping the bundle of paper between a form-plate and a table, in combination with a vertically-movable knife mounted in a traveling carriage, and mechanism, substantially as set forth, for automatically causing said carriage and its knife to approach and recede from said form-plate, and automatic mechanism for operating said knife when it has approached said form-plate and for rotating said table a partial revolution after the knife has made its cut and receded from said form-plate, as set forth.

4. In a machine for trimming books, constructed and operated substantially as set forth, and in which each revolution of the auxiliary shaft will automatically trim one side of the bundle, mechanism, substantially as described, for automatically stopping the machine at certain determinate intervals, as and for the purposes set forth.

5. In a machine for trimming books, adapted to operate substantially as set forth, the means herein shown and described for automatically moving the carriage back and forth on the bed-plate at certain determinate intervals, the same consisting of a disk K and toothed segment K′, keyed to the auxiliary shaft E′, the said disk having the beveled teeth $l$ around a portion of its inner face, pinion L, shaft L′, stop-lug $L^2$, caps $L^3$, loose pinion $L^4$, interposed between said caps, spring $L^5$, and nut $l^3$, all arranged and adapted to operate in the manner set forth.

6. In a machine for trimming books, constructed and adapted to operate substantially as set forth, the knife-bed G′, having the knife G adjustably connected thereto, said knife-bed being connected to the rear plate $G^5$ by means of the journaled rollers $g^8$, adapted to rotate in the inclined grooves $g^9$ in said plate, a suitable coiled spring being interposed around the rod $G^2$ between a lug $g^2$ on said bed-plate and the lug $g^5$, connected to the roller $g^6$, the latter bearing and rotating against one of the guide-plates $G^3$ as said knife-bed is operated, as and for the purposes specified.

7. In combination with the knife-bed and knife mounted in a movable carriage, and mechanism for automatically moving said carriage at certain determinate intervals, the lever $E^3$, pivoted to supports on the end frame, said lever being bifurcated at its top portion, shaft $H^2$, connected to said bifurcated portions, flanged roller $H^3$ on said shaft and bearing against one end of said knife-bed, and roller $e$, connected to the lower end of said lever, said roller $e$ bearing against the faces of cam $E^2$, and suitable means for rotating said cam, as set forth.

8. In a machine for trimming books, the same having a knife mounted in a movable carriage, as set forth, and a clamp-table on which the book to be trimmed is clamped, mechanism, substantially as described, for automatically imparting a partial rotation of said table at determinate intervals, for the purposes set forth.

9. In a machine for trimming books, constructed substantially as set forth and provided with a clamp-table, the means herein shown for automatically imparting a partial revolution to said table at certain determinate intervals, consisting of a vertical disk N′, keyed to the auxiliary shaft E′, said disk having a horizontal lug $n$, rectangular plate N′, keyed to shaft $N^2$, said plate having the vertical lugs $n'$, gear O, keyed to shaft $N^2$, said gear meshing with gear O′, connected to sleeve B′, to which the table C is connected, a portion of disk N being cut away, substantially as set forth.

10. In a machine for trimming books, constructed substantially as set forth, the mechanism herein shown and described for automatically stopping the machine at certain determinate intervals, consisting of lever $D^4$, having a pin $d$ connected thereto, spring $d'$, lever F, having an opening $f^3$ therein and a lug projection *f*, gear E, having the pinion $E^4$ cast thereto, and gear $E^5$, having a lug *e*, all combined and adapted to operate as set forth.

11. In a book-trimming machine having a knife mounted in a movable carriage and a clamp-table adapted to be rotated automatically a partial rotation at determinate intervals, a suitable clamp provided with a form-plate for clamping the book on said table and for guiding the knife, substantially as set forth.

12. In combination with a book-trimming machine having a clamp-table, traveling carriage, and a vertically-movable knife mounted thereon, and connecting mechanism for automatically moving said carriage, lowering the knife, and partially rotating said table, all at determinate intervals, the clamp-screw, clamp and form-plate connected to said screw, and suitable means for imparting a motion thereto in either direction, as set forth.

13. The means herein shown and described for retaining the pinion L in proper position for engagement with teeth *l* on disk K and the toothed segment K′ in their rotation, the same consisting of a stop-lug $L^2$, keyed to shaft L′ just above said pinion, said lug having a flat face bearing against the inner face of said disk, except at the cut-away portion of said disk, as and for the purposes set forth.

14. The means herein shown and described for retaining the clamp-table C in a fixed position, excepting at certain determinate intervals, the same consisting of the vertical disk N and rectangular plate N′, connected and operated substantially as set forth, the inner face of said disk impinging against one side of the plate, a portion of the bearing-face of said disk being cut away, as and for the purposes set forth.

15. In combination with the vertically-movable knife-bed and knife mounted in a traveling carriage, substantially as set forth, and suitable means for operating said knife-bed, a suitable adjusting device, as $H^4$, adjustably connected to one end of said knife-bed, as and for the purposes set forth.

16. In combination with the vertically-movable knife-bed and knife mounted in a traveling carriage adapted to operate substantially as set forth, and a suitable lever for operating said knife-bed, the means herein shown for regulating the height of said knife-bed and knife on said carriage, consisting of a set-screw, as $H^5$, as and for the purposes set forth.

CHARLES SEYBOLD.

Witnesses:
W. B. BRICE,
O. M. HILL.